(12) United States Patent
Burkill

(10) Patent No.: US 9,053,294 B2
(45) Date of Patent: Jun. 9, 2015

(54) PASSWORD GENERATION AND RECALL

(75) Inventor: Vance Burkill, Hornsea (GB)

(73) Assignee: Vance Burkill, Hornsea, East Yorkshire (GB)

( * ) Notice: Subject to any disclaimer, the term of this patent is extended or adjusted under 35 U.S.C. 154(b) by 37 days.

(21) Appl. No.: 14/114,382

(22) PCT Filed: Apr. 24, 2012

(86) PCT No.: PCT/EP2012/057495
§ 371 (c)(1),
(2), (4) Date: Oct. 28, 2013

(87) PCT Pub. No.: WO2012/146587
PCT Pub. Date: Nov. 1, 2012

(65) Prior Publication Data
US 2014/0068754 A1    Mar. 6, 2014

(51) Int. Cl.
*G06F 21/46*     (2013.01)
*G06F 21/00*     (2013.01)
*G06F 21/36*     (2013.01)

(52) U.S. Cl.
CPC ............... *G06F 21/00* (2013.01); *G06F 21/46* (2013.01); *G06F 21/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,735,385 A * | 5/1973 | Schroder et al. | ................. | 345/20 |
| 4,809,019 A * | 2/1989 | Haganuma | .................... | 347/195 |
| 5,706,496 A * | 1/1998 | Noguchi et al. | ....................... | 1/1 |
| 8,160,402 B2 * | 4/2012 | Wu et al. | ......................... | 382/309 |
| 2002/0196274 A1 * | 12/2002 | Comfort et al. | ................. | 345/741 |
| 2003/0005338 A1 * | 1/2003 | Solioz | ........................... | 713/202 |
| 2004/0139331 A1 * | 7/2004 | Sanai et al. | ................... | 713/184 |
| 2004/0230843 A1 | 11/2004 | Jansen | | |
| 2005/0160297 A1 * | 7/2005 | Ogawa | ........................... | 713/202 |
| 2005/0249349 A1 * | 11/2005 | Ghaffar et al. | ................... | 380/28 |
| 2006/0112270 A1 * | 5/2006 | Erez | ............................... | 713/168 |
| 2007/0011738 A1 * | 1/2007 | Doss | ................................ | 726/18 |
| 2008/0104707 A1 * | 5/2008 | Saka et al. | ....................... | 726/26 |

(Continued)

FOREIGN PATENT DOCUMENTS

| | | | | |
|---|---|---|---|---|
| BR | WO2007041816 | * | 9/2006 | |
| CH | EP1868125 A1 | * | 6/2006 | |

(Continued)

OTHER PUBLICATIONS

Bruce Schneier Ed—Schneier B: "Applied Cryptography, Protocols, Algorithms, and Source Code in C," Applied Cryptography Second Edition, John Wiley & Sons, Inc., New York, Jan. 1, 1996.

(Continued)

*Primary Examiner* — Peter Poltorak
(74) *Attorney, Agent, or Firm* — Reising Ethington P.C.

(57) ABSTRACT

The invention provides the ability to produce long, complex passwords from simple, easy to recall, pictorial selections. The invention features a picture based interface unit, linked to a series of individual process modules. Selecting images contained in the image selection module generates a reference pointer corresponding to coordinates in the reference pointer of the control module which thereby generates a rotor sequence that is passed to the password generator module containing ASCII characters groups. The character groups are processed according to the rotor sequence contents to produce a password that is displayed in a display module for editing and/or use.

19 Claims, 3 Drawing Sheets

(56) References Cited

U.S. PATENT DOCUMENTS

| | | | |
|---|---|---|---|
| 2008/0141362 A1* | 6/2008 | Torres et al. | 726/18 |
| 2009/0006941 A1* | 1/2009 | Yoshida | 715/227 |
| 2009/0238361 A1* | 9/2009 | Anan et al. | 380/28 |
| 2010/0180336 A1* | 7/2010 | Jones et al. | 726/19 |
| 2011/0066975 A1* | 3/2011 | Kim | 715/810 |
| 2011/0179373 A1* | 7/2011 | Moore et al. | 715/773 |
| 2011/0191592 A1* | 8/2011 | Goertzen | 713/182 |
| 2013/0194166 A1* | 8/2013 | Oksman et al. | 345/32 |

FOREIGN PATENT DOCUMENTS

| | | | |
|---|---|---|---|
| GB | 2313460 A | | 11/1997 |
| GB | 2456048 A | * | 5/2007 |
| GB | 2490580 A | * | 4/2012 |
| WO | WO0233882 A1 | | 4/2002 |
| WO | WO2005022473 A1 | | 3/2005 |
| WO | WO2008103834 A1 | | 8/2008 |
| WO | WO2010083016 A1 | | 7/2010 |

OTHER PUBLICATIONS

M. Arun Prakash et al., "Network Security-Overcome Password Hacking through Graphical Password Authentication," Proceedings of the 2011 National Conference on Innovations in Emerging Technology (NCOIET), Feb. 17-18, 2011, pp. 43-48.

Suo et al, "Graphical Passwords: A Survey," Annual Computer Security Application Conference, Dec. 8, 2005.

Combined Search and Examination Report for application No. GB1207181.7, Jul. 31, 2012, 7 pages.

International Search Report for application No. PCT/EP2012/057495, Aug. 7, 2012, 4 pages.

Written Opinion for application No. PCT/EP2012/057495, Aug. 7, 2012, 6 pages.

* cited by examiner

PASSWORD GENERATION AND RECALL

FIELD OF THE INVENTION

The present invention is concerned with improvements in or relating to password generation, recall and protection. Particularly, but not exclusively, the invention relates to the use of passwords for verifying a user's identity when accessing secure data and services electronically. In one embodiment, the present invention advantageously assists the user to create and/or set passwords that are longer and less obvious, and therefore more secure, than conventionally used passwords, and to recall them with ease. Aspects of the invention relate to a method, to a device, to a program installed on a computer and to a computer.

BACKGROUND

It is common practice within information technology applications to use passwords or other codes to identify users. By way of example, access to software applications, internet banking or online purchasing applications and telephone banking services may require user identification by means of passwords selected by the user.

Identity fraud is a major concern to industries such as retailers, credit card companies and banks and thus password security is of paramount importance. It is generally accepted that password security, in the sense of resistance to a so-called "brute force attack" in which a password is cracked by systematically trying all possible passwords, can be increased by the use of longer, more complex passwords.

For example, while a 4-bit (i.e. 4 character) password would require only $2^4$ calculations in order to try all possible combinations, a 128-bit (i.e. 128 character) password requires $2^{128}$ calculations in order merely to sequence through the possible values. It is calculated that the energy required to break a 128-bit symmetric password is more than 30 gigawatts of power for a full year. In addition, the time to check all $2^{128}$ possibilities of a 128-bit key using a processor capable of checking $10^{18}$ combinations per second would require approximately $10^{13}$ years.

These energy and time restrictions render 128-bit passwords impractical to cracking by brute force attack methods using current technology and resources. However, the user's ability to accurately recall and input the password decreases as the length, complexity and randomness of the password increases. Thus, it is considered unlikely that a user would be able to recall and enter a 128-bit password for identification purposes without a written prompt. This problem is exacerbated if, as is commonly advised, different passwords are set by the user to access different applications.

A solution to the problem of verifying a user's identity has been proposed in WO2007/063346. This document discloses a method for verifying a person's identity in which a Personal Identification Pattern (PIP) is registered with the authenticator. When overlaid on a pseudo-random grid of numbers, the PIP defines a sequence of numbers representing the user's password.

In use, the user is presented with a number grid and selects the numbers corresponding to the PIP. Since the PIP is known by the authenticator, the returned sequence of numbers is compared with the expected sequence according to the grid presented and the user is verified if the two sequences are identical.

Since only the pattern is known by the authenticator, the grid can be changed to include different numbers each time it is presented to the user so that a different sequence of numbers is returned each time the user is challenged. Furthermore, since each number is repeated several times in the grid, it is considered difficult for a casual observer to determine the pattern from the number sequence input by the user.

The above solution assists the user to recall and accurately input their password. However, since the solution requires a unique number grid to be presented to the user each time the user is required to be identified, significant revision to the application software and/or hardware must be implemented by the authenticator. Furthermore, the security of the password depends on the complexity of the PIP—a simple four-point PIP may be easily recalled by the user, but provides only limited security, while a more complex eight- or twelve-point PIP increases security (although only slightly) but will be more difficult for the user to accurately recall and enter.

A need therefore exists for a method, software application or device which enables a user to reliably recall and input longer, more complex passwords when verifying their identity. It would also be advantageous if such a method, application or device, were compatible with conventional text-box character entry systems widely used for personal identity verification.

It is an aim of the present invention to address one or more of these issues and to improve upon current technology and methods. Embodiments of the invention may provide a method, a device, a software program or a computer which enables a user to quickly and reliably recall and enter complex passwords of up to 128 characters. Other aims and advantages of the invention will become apparent from the following description, claims and drawings.

SUMMARY OF THE INVENTION

Aspects of the invention therefore provide a method, a device, a computer program, and a computer as claimed in the appended claims.

According to another aspect of the invention for which protection is sought there is provided a method for generating and/or recalling a password comprising:
  generating a multi-digit number in dependence on the selection by a user of one or more visual indicators;
  stepping through each of a plurality of sequences of alphanumeric characters by an amount corresponding to a respective one of the numbers in the multi-digit number thereby to identify a respective character; and
  displaying to said user the respective alphanumeric character from each sequence thereby to form said password.

In an embodiment, the method comprises displaying a plurality of unique images for selection by the user and associating each image with a number.

In an embodiment, generating the multi-digit number comprises applying an operator to the respective number associated with each image selected by the user thereby so as to form a first multi-digit number.

In an embodiment, the method comprises concatenating the numbers associated with each of a plurality of selected images thereby to define said first multi-digit number.

In an embodiment, generating the first multi-digit number comprises permitting said user to select two or more images from said plurality of images, associating a respective two-digit number with each of the selected images, and concatenating the at least two two-digit numbers to define said first multi-digit number.

In an embodiment, the method comprises providing a plurality of image sets, each image in a common set being associated with a respective two-digit number.

In an embodiment, the method comprises providing three sets of images, each set being displayable to a user in the form of a plurality of pages each page comprising a plurality of images.

In an embodiment, the method comprises generating three two-digit numbers, each two-digit number corresponding to a selected image from a respective one of the sets, concatenating the three two-digit numbers to form a six-digit number, said six-digit number defining the multi-digit number.

In an embodiment, the step of generating the multi-digit number comprises:
  generating a first multi-digit number associated with the selected visual indicators or images; and
  determining a second multi-digit number from a matrix of numbers in dependence on the first multi-digit number;
  wherein the method comprises stepping through each of the plurality of sequences of alphanumeric characters by an amount corresponding to a respective one of the numbers in the second multi-digit number thereby to identify the respective character.

In an embodiment, determining the second multi-digit number comprises:
  identifying in the matrix of numbers a start number corresponding to the first multi-digit number; and
  determining a sequence of numbers from the matrix having a predetermined relationship to the start number, said sequence defining the second multi-digit number.

In an embodiment, each of the plurality of sequences of alphanumeric characters comprises a rotor having a default alphanumeric character and which is rotatable through a number of steps corresponding to a numerical value of a respective digit in the first or second multi-digit number.

In an embodiment, the method comprises generating a respective basic password on selection by the user of each of a plurality of visual indicators or images and automatically copying each of the respective basic passwords into an editing panel, thereby to combine or concatenate same as they are generated thereby to form said password.

In an embodiment, the method comprises editing the password using one or more of the following functions:
  resetting the password to a default password;
  reversing the sequence of characters in the password;
  changing the case of the sequence of characters in the password;
  adding or appending multiples of the password, for example 1×, 2×, 4×, 8× and 16× multiples;
  adding, changing or deleting characters in the password;

According to yet another aspect of the invention for which protection is sought there is provided a computer program configured to perform the method set out in any of the preceding aspects or embodiments.

According to a further aspect of the invention for which protection is sought, there is provided a device, such as a computer, a nomadic device, a processor or a memory, programmed to perform the method set out in any of the preceding aspects or embodiments.

According to a still further aspect of the invention for which protection is sought, there is provided a computer or a nomadic device programmed to:
  permit a user to select two or more images from a plurality of sets of images;
  associate each selected image from each set of images with a respective number;
  generate a first multi-digit number by concatenating the respective numbers;
  identify in a matrix of numbers a start number corresponding to the first multi-digit number;
  determine a sequence of numbers from the matrix having a predetermined relationship to the start number, said sequence defining a second multi-digit number;
  step through each of a plurality of alphanumeric character sequences from a default character by an amount corresponding to the numerical value of a respective digit of the second multi-digit number; and
  display the resulting character from each sequence to form a basic password.

In an embodiment, the computer or nomadic device is programmed to display the or each basic password in a manner permitting it to be edited using one or more of the following functions:
  resetting the password to a default password;
  reversing the sequence of characters in the password;
  changing the case of the sequence of characters in the password;
  adding or appending multiples of the password, for example 1×, 2×, 4×, 8× and 16× multiples;
  adding, changing or deleting characters in the password;

According to yet another aspect of the invention for which protection is sought, there is provided a device, such as a computer, a nomadic device, a processor or a memory, including a program comprising:
  an image selection module for permitting a user to select one or more images from a plurality of images;
  a control module comprising a random or pseudo-random sequence or matrix of numbers;
  a password generator module for generating a basic password;
  a display module for displaying the basic password; and
  wherein the aforementioned modules are arranged to cooperate so as to associate images selected from the image selection module with numerical elements within the control module, said numerical elements being used to determine the selection of alphanumeric characters by the password generator module thereby to generate the basic password for displaying in the display module.

In an embodiment, the program comprises a password editor module configured to permit the user to edit the basic password displayed by the display module.

In an embodiment, the password generator module is arranged to generate a respective basic password on selection by the user of each image from the plurality of images and wherein the password editor module is selectively operable automatically to copy each of the respective basic passwords into an editing panel, thereby to combine or concatenate same as they are generated.

In an embodiment, the password editor module is configured permit the user to edit the password in the editing panel using one or more of the following functions:
  resetting the basic password to a default password;
  reversing the sequence of characters in the basic password;
  changing the case of the sequence of characters in the basic password;
  adding or appending multiples of the basic password, for example 1×, 2×, 4×, 8× and 16× multiples;
  adding, changing or deleting characters in the basic password;

In an embodiment, the image selection module is configured to present a plurality of unique images for selection by a user, the images being displayed in the form of sequentially accessible grids or matrices of images that together constitute an image set or stack, each of the images in the set or stack having associated with it a respective identification number.

In an embodiment, the program comprises a plurality of image sets or stacks, wherein on selection of images from each of the plurality of image sets or stacks the image selection module is configured to concatenate the respective identification numbers to form a first multi-digit number that defines a reference pointer to a corresponding number within the matrix or sequence of numbers in the control module.

In an embodiment, the control module comprises one or more sets of randomly generated numbers and is configured to select a sequence of numbers therefrom in dependence on the reference pointer defined by the first multi-digit number, so as to generate a second multi-digit number.

In an embodiment, the control module is arranged to generate the second multi-digit number having a number of digits corresponding to a number of ASCII or alphanumeric character sequences within the password generator module.

In an embodiment, the password generator module comprises a plurality of rotors, rows or columns, each representing a respective one of said ASCII or alphanumeric character sequences, one of said characters in each sequence defining a respective default character for that sequence, wherein the password generator module is configured to step through each of the sequences, starting from the respective default character, by a number of steps corresponding to the numerical value of a respective one of the digits in the second multi-digit number and to output the resulting ASCII or alphanumeric character from each sequence thereby to form the or each basic password therefrom.

In an embodiment, the image selection module comprises three sets or stacks each comprising a plurality of images, wherein the selection or non-selection of an image from each stack by a user is associated with a respective two digit number unique to that set or stack such that the selection of a first image from a first one of said stacks generates a six digit number corresponding to the selection of said image in that stack and the non-selection of images from the remaining stacks.

In an embodiment, the subsequent selection of a second image from a second one of said stacks generates a different six digit number corresponding to the selection of the first and second images from the first and second stacks and the non-selection of an image from the third stack.

In an embodiment, the display module is configured to display each of the six-digit numbers as they are generated.

In an embodiment, the program comprises an aggregator module that receives basic passwords from the display module and permits user selected predefined editing operations to operate on the contents of the aggregator, including a reset control that clears the aggregator contents, a reverse control that reverses the contents of the aggregator, a character case control that unifies and swaps the case of all the characters in the aggregator and controls that can append 1×, 2×, 4×, 8× and 16× duplicates of the password displayed in the display module directly into the aggregator module.

Embodiments of the invention may advantageously provide the ability to produce long, complex passwords from simple, easy to recall, pictorial selections. Embodiments of the invention feature a picture based interface unit, linked to a series of discreet process modules. Selecting images contained in the image selection module produces a reference pointer which is passed to the control module. Coordinates in the reference pointer select sections of the control module to form a rotor sequence that is passed to the password generator module containing characters groups. The character groups are processed according to the rotor sequence contents to produce a longer more complex password output relative to the user input. The password is displayed in the readout module for use. Further password editing and processing is available via controls in the readout and aggregator modules that facilitate increased password complexity with minimal user input.

It is to be expressly noted that, within the scope of this application, the various aspects, embodiments, examples and alternatives, and in particular the individual features thereof, set out in the preceding paragraphs, in the claims and/or in the following description and drawings may be taken independently or in any combination. For example, features described with reference to one embodiment are applicable to all embodiments, except where such features are incompatible.

BRIEF DESCRIPTION OF DRAWINGS

One or more embodiments of the present invention will now be described, by way of example only, with reference to the accompanying drawings, in which.

In the illustrated embodiment, the invention comprises a method, embodied in a software programme or "unit" in the form of an Adobe® Flash® Projector file which can be executed and run as a standalone application on any electronic device (host device) which supports the Adobe® Flash® format such a personal computer, smartphone, processor, memory or the like. It is to be noted, however, that the host device need not have Flash® player installed on it since each unit contains its own Flash® Player. Furthermore, the invention is not limited to the Adobe® Flash® format and may, using customary knowledge of the skilled artisan, be formatted for use on substantially any desired operating platform including, but not limited to, Windows®, Android®, Silverlight®, iOS®, etc.

Each unit incorporates approximately one million eight bit (eight character) basic passwords. Each basic password is formed by means of software-generated algorithms based broadly on the Lorenz cipher. More particularly, each unit incorporates a password generator consisting of, but not limited to, eight "rotors" numbered #1-#8, each of which comprises a sequence of ten ASCII characters, and the basic password is generated by concatenating the selected characters or digits of the eight rotors. The ASCII characters corresponding to each rotor #1-#8 are determined by means of a control file which is either loaded from an external location or embedded within the unit coding. Individual ASCII characters may be repeated across rotors or on individual rotors but, since only eighty characters are required in order to fill the rotors, it is possible for all of the characters to be mutually different across the rotors, there being a much larger number of ASCII characters available. Rotor characters are, however, not limited to the ASCII table.

Figure 1:
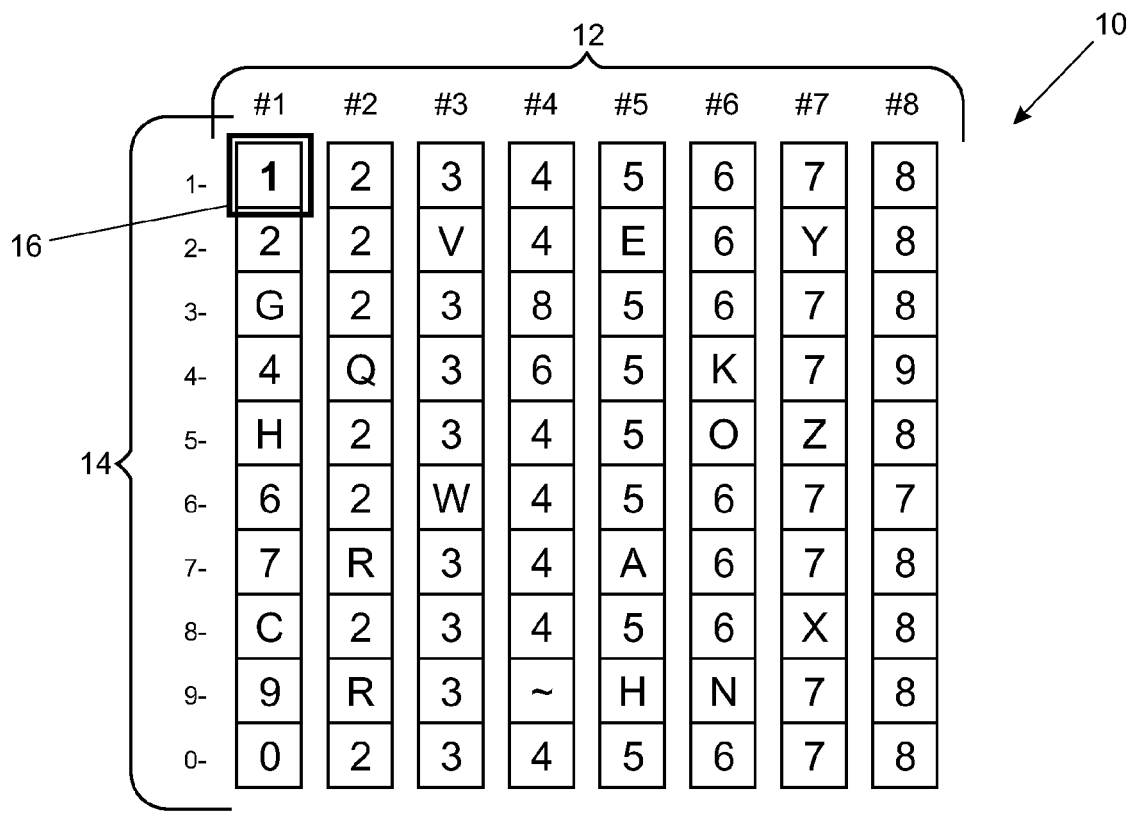
FIG. 1 shows a graphical representation of a password generator used in a software implementation of an embodiment of the invention.

A graphical representation of the password generator 10 is shown at FIG. 1 by means of a 10×8 matrix or array in which each column 12 represents one of the eight rotors #1-#8, and each row 14 represents a character position on the respective rotor. Each rotor #1-#8 has one row (character position) that represents a default position for the rotor for defining the starting point for character selection, as described below, and a "window" 16 for identifying the character that is returned by the rotor when the basic password is generated. In the illustrated embodiment, the character in the top row (shown in bold font) constitutes the default position for each rotor and the window 16 is aligned with the default position for the rotor.

Figure 2:
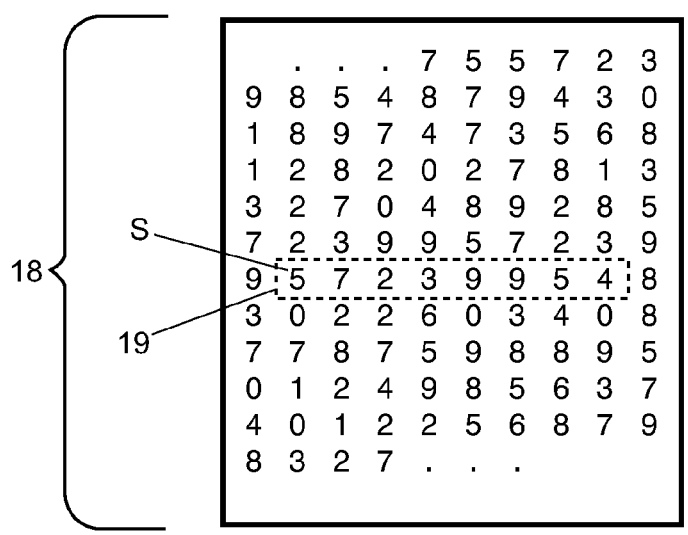
FIG. 2 shows a graphical representation of part of a control file used in the embodiment of FIG. 1.

FIG. 2 illustrates a portion of the control file that determines the operation of the rotors #1-#8 to generate a basic password. The control file comprises a random or pseudo-random matrix or array 18 of numbers from 0 to 9. Each number represents the number of steps that each rotor #1-#8 should be advanced through when generating the basic password, as described below.

Figure 3:
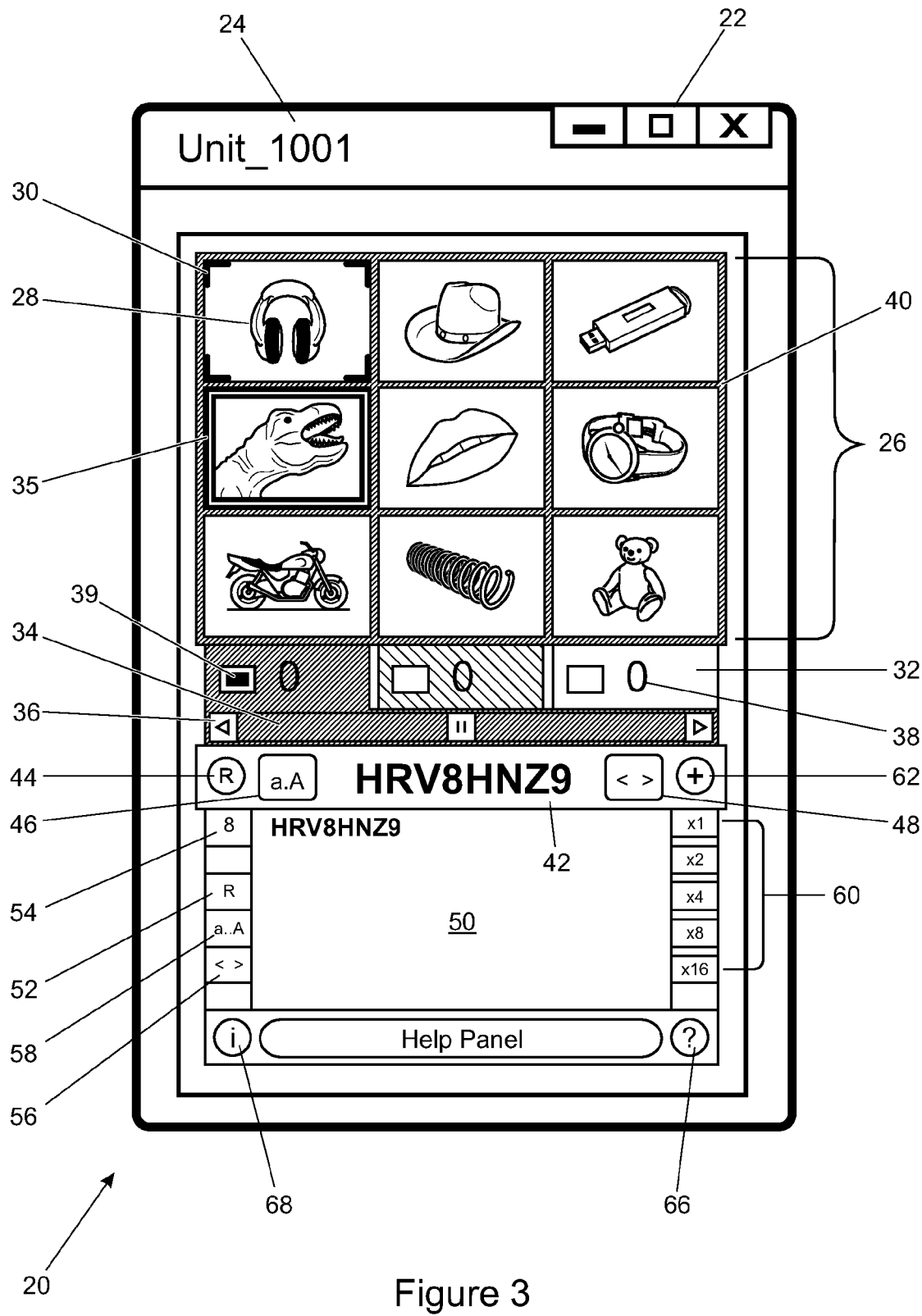
FIG. 3 shows a user interface of the embodiment of FIG. 1.

Referring now to FIG. 3, this illustrates a user interface of an embodiment of the present invention. On execution of the invention according to the embodiment of FIG. 1, a new window 20 is opened on the display of the host device. The window 20 can be maximised, minimised or closed, using the conventional Microsoft Windows® buttons 22 at the right hand side of the windows title bar 24, or can be resized in the conventional manner using the mouse or pointer of the host device. The windows title bar can also display the unit identification number.

The upper half of the window 20 comprises an image frame in the form of a nine-cell table 26 arranged in a 3×3 grid. Other image grid arrangements are possible. Each cell of the table contains an individual image 28, such as a photograph or picture, of an object, article or feature which is easily recognisable to the user.

Although only nine images 28 are visible simultaneously in the image frame 26, the unit actually contains two hundred and seventy images divided into three groups or "stacks". The stacks are designated, respectively, red, green and blue and each contains ten pages numbered 0 to 9, each page having nine images 28.

Advantageously, each picture is intended to be identifiable to the user by a single word or phrase which is not repeated throughout the image set, so that the images 28 are mutually distinguishable and unlikely to be confused. Image sets can be duplicated and differentiated by stack colour or other stack identifier. This dramatically reduces the number of images required and therefore the file size.

Each image 28 in the table 26 is selectable using the mouse or pointer of the host device. As the mouse or pointer is moved over the image 28, the corners of the cell containing the image are highlighted or emphasised by markers 30 and the image in the cell is slightly faded. Once selected, by clicking the mouse or pointer, the cell containing the image is highlighted or emphasised by means of an increased border thickness 35. The border is maintained on the cell to identify the selected image 28 even if the mouse or pointer is subsequently moved over adjacent cells or stack pages. Clicking the mouse or pointer on a selected cell deselects the image.

The stacks are selected by means of stack selection buttons 32 positioned beneath the image frame 26 which are actionable by means of the mouse or pointer of the host device. Each stack button 32 is coloured according to the stack name for ease of recognition and indicates, by means of a number, the currently visible page of the stack.

The pages of each stack are selected by means of a slider 34 disposed between the image frame 26 and the stack buttons 32. The slider 34 can be moved or scrolled through the pages of the stack by means of the mouse or pointer of the host device in order to select the desired page in the stack. In addition, arrow buttons 36 are provided at each end of the slider 34 which, when actuated using the mouse or pointer, sequentially step through the pages in ascending or descending order, respectively. A further indication of the selected stack page is provided by means of a stack page marker 38 positioned in the stack button 32.

To facilitate use of the invention, the grid lines 40 separating the cells 28 of the image frame table 26, the slider 34 and arrow buttons 36 and the page marker 38 are coloured according to the selected stack (i.e. red when the red stack is selected, green when the green stack is selected, etc.)

Markers 39 are also provided to indicate which of the stacks have images selected. Clicking on the markers 39 causes the corresponding stack and selected picture to be displayed in the image frame 26.

Positioned beneath the stack buttons 32 is a text readout box 42 which displays the eight-character basic password according to the selected image 28. The basic password is generated in the following manner:

Each image 28 in a stack corresponds to a reference number from 00 to 99, with the page number determining the first digit (the "tens") of the reference number and the image determining the second digit (the "units"). By way of example, the top left image of the first page (page 0) of the red stack (a pair of headphones in the example of FIG. 1) may correspond to the reference number 01, while the bottom right image of the last page (page 9) of the red stack (not shown) may correspond to the reference number 99. The zero reference numbers (i.e. 10, 20, 30, etc.) may correspond to a page with no image selected. In other words, if page 0 of the red stack is displayed but no image is selected, this may correspond to the reference number 00 and if page 4 of the red stack is displayed but no image is selected, this may correspond to the reference number 40.

The preceding paragraph applies equally to the green and blue stacks, the images in each of which also corresponding to a two digit reference number from 00 to 99. The reference numbers denoted by the images selected in all three stacks are concatenated to generate a six digit "pointer number" with values from 000000 (no images selected from any stack) to 999999 (the last image from the last page of each stack selected).

It will be appreciated by those skilled in the art that this numbering system is not essential and that other methods, for example hexadecimal numbering, may be employed depending on application or the number of stacks, pages and/or images included in the unit.

The six digit pointer number corresponding to the selected combination of images 28 represents a pointer to a specific position in the matrix or array 19 of the control file. The position in the array 18 to which a given pointer number points is determined by the coding of the unit software.

The number in the array 18 that is located at the specific position pointed to by the pointer number represents the starting digit for an eight digit number sequence (hereafter termed rotor sequence) that is used to denote the number of steps, starting from the default position, through which the rotors #1-#8 of the password generator 10 are shifted or rotated.

That is to say, the starting digit (i.e. the digit located at the specific position in the second control file corresponding to the pointer number) represents the first digit of the rotor sequence and the number (numerical value) thereof denotes the number of steps through which the first rotor #1 of the password generator is advanced from the default position. The number (numerical value) of the second digit in the rotor sequence (i.e. the digit adjacent to the starting digit) determines the number of steps through which the second rotor #2 of the password generator 10 is advanced from the default position, and so on up to the eighth rotor #8.

Once each of the rotors #1-#8 of the password generator 10 has been moved or rotated through the respective number of steps determined by the rotor sequence, the password generator 10 returns the basic password corresponding to the window 16 of each rotor. An example may serve to explain this process more clearly.

EXAMPLE 1

It is assumed that the user has selected the following sequence of images 28 in the image frame 26 using the mouse or pointer of the host device:
$1^{st}$ Image: Red Stack—page 2, image 3;
$2^{nd}$ Image: Green Stack—page 9, image 7;
$3^{rd}$ Image: Blue Stack—page 0, image 1.

As will be understood from the description above, the reference number for the red stack in this example is 23, the reference number for the green stack is 97 and the reference number for the blue stack is 01. The six-digit pointer number corresponding to this combination of images would therefore be 239701.

In this example, the coding for the unit determines that the pointer number 239701 points to the position in the matrix of the second control file denoted by reference numeral S in FIG. 2. Thus the number at position S (in this case having numerical value 5) becomes the starting digit for the rotor sequence (dashed box 19) which comprises the number at position S and the subsequent seven digits, i.e. 57239954. It is to be noted that it is not essential for the eight-digit number (rotor sequence) to be defined by eight sequential digits in the control file. On the contrary, any sequence of numbers having a predetermined relationship to the number at position S (in this embodiment) can be used to define the rotor sequence. For example, the control file may be arranged to take the number at position S as the first digit of the rotor sequence, and then every second digit forwards or backwards therefrom up to the required eight-digits. It will be appreciated, therefore, that the ways in which the control file determines the rotor sequence from the pointer number are substantially unlimited.

The selected rotor sequence is applied to the rotors #1-#8 of the password generator 10. Referring to FIG. 1, the window 16 for each rotor #1-#8 initially corresponds to the default position which is the top row in the matrix 10. When the rotor sequence 19 is applied to the password generator 10, the character sequence (rows) 14 for each rotor #1-#8 moves or rotates relative to the window through the number of steps corresponding to the respective digit of the rotor sequence 19. The character aligned with the window 16 on each rotor #1-#8 at the end of this movement or rotation is then returned as a digit of the eight character basic password to be displayed in the text readout box 42.

Figure 4:
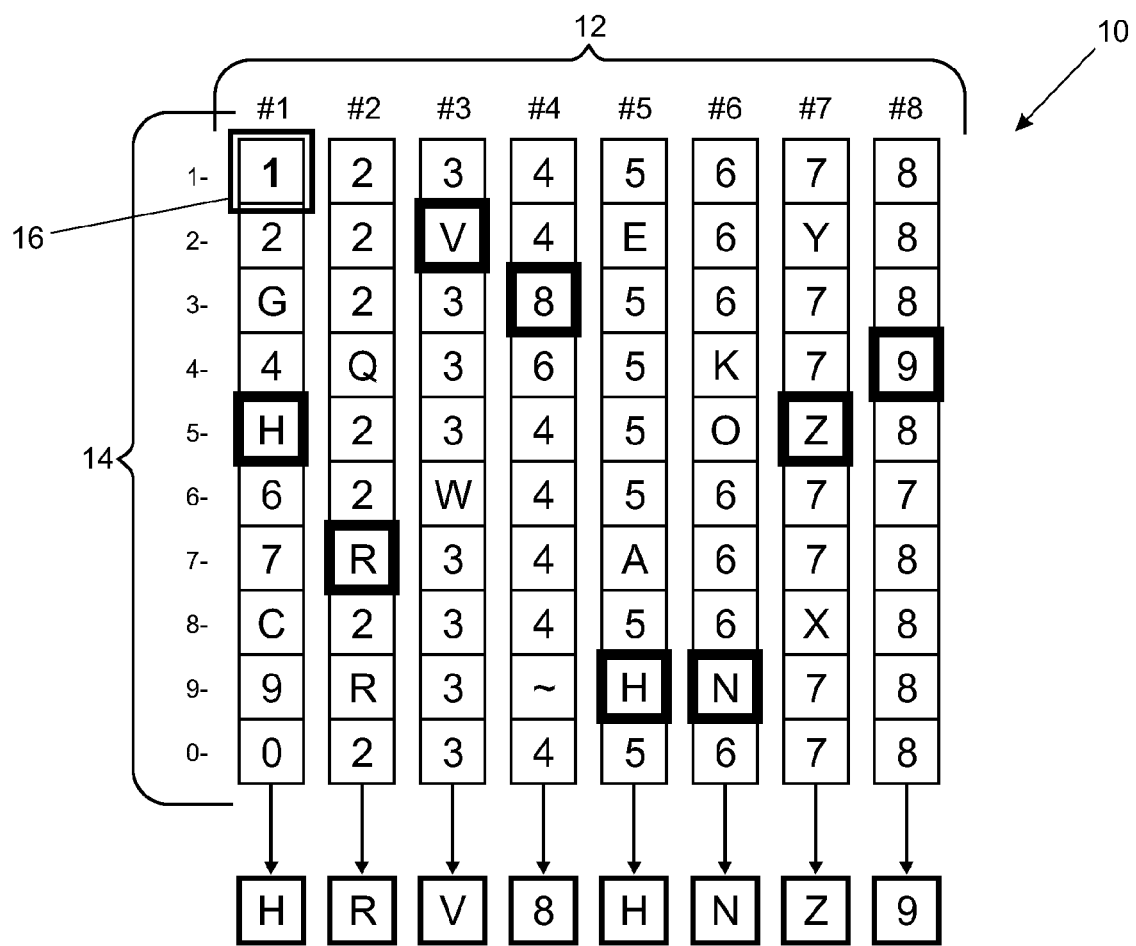
FIG. 4 shows the password generator of FIG. 1 during generation of a basic eight-character password.

In the illustrated example, therefore, the first rotor #1 is moved by five steps, 5 being the first number in the rotor sequence 19. This results in the character H being aligned with the window 16, as shown in FIG. 4. In addition, the second rotor #2 is moved by seven steps, 7 being the second number in the rotor sequence 19, resulting in the character R being aligned with the window 16. Furthermore, the third rotor #3 is moved by two steps, 2 being the third number in the rotor sequence 19, resulting in the character V being aligned with the window 16. This operation is repeated for the remaining rotors #4-#8 as shown in FIG. 4.

Thus, the eight digit basic password returned by the password generator 10 and displayed in the text readout box 42 is "HRV8HNZ9", as shown in FIG. 3.

It will be appreciated that a pointer number will be generated even when only a single image 28 is selected. In the case of Example 1, the selection of the $1^{st}$ image (red Stack, page 2, image 3) modifies the first two digits of the pointer number, thereby generating a pointer number of 230000. It will be understood that this pointer number points to a specific position in the matrix 18 of the control file, different from that of pointer number 239701, resulting in a different rotor sequence 19 being applied to the rotors #1-#8 of the password generator 10 and thus a different basic password being generated. In this case, when the user selects the $1^{st}$ image 28, the basic password "CRW~AOY9" is generated and displayed in the text readout box 42

Likewise, when the $2^{nd}$ image is selected by the user, this alters the second pair of digits of the pointer number thereby generating a pointer number of 239700. Again, this pointer number points to a specific position in the matrix 18 of the second control file different from that of pointer numbers 230000 and 239701, resulting in another rotor sequence being applied to the password generator and hence another basic password being generated. Here, when the user selects the $2^{nd}$ image, the basic password "GQ36EKX7" is generated and displayed in the text readout box 42.

It is only on selection of the $3^{rd}$ image 28 that the pointer number becomes 239701, as the final two digits are changed from 00 to 01 by the $3^{rd}$ image selection. The password generator 10 then returns the basic password "HRV8HNZ9" as described above, which is then displayed in the text readout box 42.

It is to be noted that the pointer number is dependent only on the combination of images selected, and not the sequence or order in which they are selected. For example, the pointer number 239701, corresponding to the basic password "HRV8HNZ9" can be produced by selecting the images not only in the order described above but also in the reverse order and any other order.

It will be appreciated, of course, that if the images 28 are selected in the reverse order, then the sequence of pointer numbers produced will be 000001, 009701 and 239701, meaning that the first and second basic passwords displayed in the text readout box 42 will differ from those described above. Only when the final image of the three images (in this case the $1^{st}$ image, i.e. red stack, page 2, image 3) is selected will the final basic password "HRV8HNZ9" be displayed in the text readout box 42.

In essence, the generation of the pointer number and the corresponding basic password is comparable to the expressing of colours using r-b-g notation and the selection of subsequent images has a cumulative effect on the pointer number. In the case of Example 1 above, the pointer number after the third image is selected is 239701 irrespective of the order in which the images were selected.

If a fourth image is then selected, however, only the pair of digits (reference number) corresponding to the stack from which the fourth image is selected is changed. For example, if the fourth image selected is the green stack, page 4, image 6, only the second two digits (green stack reference number) of the pointer number change, resulting in a pointer number of 234601. Similarly, if a fifth image is then selected from the red stack, page 1, image 2, the pointer number changes to 124601.

In other words, the pointer number is not automatically reset to a default value, such as 000000, during or after a selection of images. It can be reset manually, however, by actuation of a reset button 44 disposed to the edge of the password panel 42. At any time during or after the image selection, the basic password, consisting of eight digits, can be edited within the text readout box 42 by actuating two basic editing buttons 46, 48 disposed either side of it in the user interface window 20 using the mouse or pointer of the host device. The button 46 on the left hand side of the text readout box 42 can be used to change the case of the characters in the basic password, while the button 48 on the right hand side can be used to reverse the order of the characters in the basic password.

Beneath the text readout box 42 and basic editing buttons 46, 48 is a so-called aggregator which constitutes a password editor for the unit. The aggregator comprises a password panel in the form of a text readout box 50 and a range of editing buttons 52-60 positioned either side thereof.

On the left hand side of the password panel there is provided a reset button 52 for resetting the contents of the password panel 50, a character counter 54 which indicates the total number of characters in the password displayed in the password panel 50, a character reverse button 56 for reversing the sequence of characters in the password displayed in the password panel 50 and a case change button 58 for switching the case of the sequence of characters in the password displayed in the password panel 50.

On the right hand side of the password panel 50 there is provided a plurality of password multiplier buttons 60 which, when actuated, add multiples of the currently selected basic password (displayed in the text readout box 42) into the password panel 50. In the illustrated embodiment multiplies of 1, 2, 4, 8 and 16 of the currently displayed basic password can be appended to the password displayed in the password panel 50.

The aggregator permits the basic passwords generated and displayed in the text readout box 42 to be added to the password panel 50 and concatenated to form passwords that are of substantially any length. In the illustrated embodiment, the maximum password length is 128 characters, but in other embodiments there is essentially no limit to the number of characters in a password. The number of characters in the current password is shown by the character counter 54.

Once entered into the password panel 50, the characters can be edited using the character reverse or case change buttons 56, 58. In addition, however, the password panel 50 has full text editing capability, permitting the password to be edited at will by the user. For example, individual characters can be added or deleted as desired, using the keyboard of the host device, or can be moved within the password using the mouse or pointer and clipboard functions of the host device.

The password panel 42 provides an aggregator control button 62 which toggles the automatic aggregator function on or off. In the illustrated embodiment, the aggregator function is on by default, although this is not essential.

When the aggregator function is on, every image selection results in the relevant basic password displayed in the text readout box 42 being copied into the password panel 50. That is to say, in the case of Example 1 above, with the aggregator function on, the selected sequence of three images results in all three 8-character basic passwords ("CRW~AOY9", "GQ36EKX7" and "HRV8HNZ9") being inserted and displayed in the password panel 50 as a single 24-bit password "CRW~AOY9GQ36EKX7HRV8HNZ9".

With the aggregator function off, however, the basic password displayed in the text readout box 42 is not automatically added to the password panel 50. In Example 1, therefore, with the aggregator function off, none of the basic passwords are automatically copied to and displayed in the password panel 50. Switching the aggregator function on during or after image selection causes the currently displayed basic password and subsequently displayed basic passwords to be copied to the password panel 50.

For example, if the aggregator function is turned off before the $1^{st}$ image is selected, the $1^{st}$ and $2^{nd}$ image selections cause the basic passwords "CRW~AOY9" and "GQ36EKX7" to appear successively in the text readout box 42, as described above. These basic passwords are not, however, copied to the password panel 50.

If, prior to selection of the $3^{rd}$ image, the user then switches the aggregator function on, the currently displayed basic password "GQ36EKX7" in text readout box 42 is pasted into the password panel 50. Then, following selection of the $3^{rd}$ image, the basic password "HRV8HNZ9" displayed in the text readout box 42 is also added into the password panel 50, resulting in a 16-character password "GQ36EKX7HRV8HNZ9" being displayed in the password panel 50.

It is to be noted that the password "GQ36EKX7HRV8HNZ9" can only be generated using the above described sequence of events, i.e. aggregator function off, select $1^{st}$ image, select $2^{nd}$ image, aggregator function on, select $3^{rd}$ image. If any of those steps are eliminated or modified, the final password displayed in the password panel 50 will be different.

For example, even though the basic password "CRW~AOY9" corresponding to the $1^{st}$ image is not added to the password panel 50, eliminating the initial selection of the $1^{st}$ image will result in a different password being displayed in the password panel 50.

More specifically, if selection of the $1^{st}$ image is eliminated and a combination of only the $2^{nd}$ and $3^{rd}$ images is selected (i.e. green stack, page 9, image 7 is initially selected, followed by blue stack, page 0, image 1) the password "HQ28IOZ#ALW5IQ39" is displayed in the password panel 50. This is because the pointer numbers generated by initial selection of the $2^{nd}$ image (without prior selection of the $1^{st}$ image) followed by selection of the $3^{rd}$ image are 009700 followed by 009701. Since both of these pointer numbers are different from those of the above example, two different basic passwords (in this case "HQ28IOZ#" and "ALW5IQ39") are returned and displayed in the password panel 50 as a single 16-character password.

Thus, unlike the pointer number which is dependent only on the combination of images selected, when the aggregator function is switched on, the final password displayed in the password panel 50 is dependent on the sequence or order in which the images 28 are selected. It is therefore particularly important that the user, when creating a password, selects a sequence of images or events that is easy to recall accurately.

A general description of the use of the present invention is now provided in the context of opening a new account with an online bank.

On setting up the account using a web-based browser, the user may be requested to provide a unique user name and password by which the user can be recognised by the bank when subsequently accessing the account online. Text fields may be provided on the web page into which the user name and password are to be inserted.

Conventionally, users select user names and passwords that are short and easily remembered, so as to avoid the need to write them down. For example, children's names and dates of birth are often used as the basis for passwords. Such user names and passwords, however, are often easy to crack using brute force attacks.

In this case, therefore, the user creates a password using the software unit of the present invention. Firstly, the user opens and runs the software unit on a personal computer, mobile telephone or other suitable device. On opening the unit, the user is presented with the user interface such as that shown in FIG. 3.

To create the password, the user selects a sequence of one or more images from the two hundred and seventy images 28 contained in the image stacks. As described above, the user can switch between stacks, and between pages in each stack, using the stack buttons 32, the slider 34 and slider buttons 36. It is advantageous that the user selects a sequence of images that is easily recalled.

Each time the user selects an image 28 from the image set displayed in the image frame 26, the corresponding eight-character basic code generated by the password generator 10 is displayed in the text readout box 42 and, moreover, is copied to the password panel 50. The user is free to select only one image 28 or a number of different images until the character count of the password in the password panel 50 reaches the desired number.

For example, for optimum security, the user may wish to create a 128-bit (128 character) password. Such a password could be created in numerous ways. For example, the user may wish to select a sequence of sixteen images 28 to generate the password in the password panel 50. The selected images could occur only once in the sequence or more than once. With the aggregator function switched on, the basic password corresponding to the cumulative selection of images is added to the password panel 50 as each image 28 is selected. Thus, a sequence of sixteen images results in a 128-bit password being displayed in the password panel 50.

Alternatively, since it may be difficult to recall a sequence of sixteen images in the correct order, the user may wish to select a smaller number of images but make use of the password multiplier function in order to generate a 128-character password. In this case, the user could select, for example, a single image to create an 8-character password and then use the 16× password multiplier to expand the password to 128-characters.

Alternatively still, the user could select a first image 28 to generate an eight character password in the password panel 50 and then use the 8× password multiplier to expand the password to 64 characters. A second image could then be selected and the 8× password multiplier used again to append a further 64 characters to the password displayed in the password panel 50.

At any time during or after the creation of the password in the password panel 50, the user is able to edit the password using the character reverse button 56 or the case change button 58. In addition, since the password panel 50 provides full text editing functionality, the user is free to edit the password by, for example, adding or deleting characters or adjusting the order of the characters. Again, however, it is important that any such editing steps can be readily recalled by the user so that the correct password can be called up when required.

When the user is satisfied with the sequence of image selection and editing steps, and the character count of the password displayed in the password panel 50 is at the desired number (e.g. 128 characters), the password can be highlighted using the mouse or pointer of the host device and then copied and pasted into the text boxes of the web page. As described above, a 128-character password is considerably more secure than the shorter passwords conventionally used.

Thereafter, when required to verify the user's identify (for example when subsequently attempting to access the online bank account), the user simply runs the same software unit again and enters the known sequence of image selection and editing steps that were carried out when the password was created and the password displayed in the password panel 50 will correspond exactly with the originally generated password. Again, therefore, the user can type or highlight, copy and paste the password into the relevant text field in the requesting website or, in the event that verification is required verbally, the password can simply be read from the password panel 50.

Unlike prior art methods or systems, the present invention enables the user to create and accurately recall long and complex passwords with ease by providing the user with a series of easily identifiable pictures, each of which corresponds to an eight character password. Individual or sequences of images can be selected to create passwords of any desired length. For example, passwords of 128 characters or more can be created and quickly recalled by entering the selected sequence of images. It is envisaged that passwords having as much as 384 bits can be created quickly and simply and recalled accurately.

By selecting images that have significant meaning for the user, depict a story or simply appear in a predetermined pattern in the image frame 26, the user can create a long and complex, pseudo-random password which can easily and reliably be recalled merely by repeating the well-known image sequence. The present invention offers numerous advantages over prior art methods and systems.

For example, each unit provides approximately 1 million eight-character basic passwords. However, the file size for the unit is relatively small due to the efficient use of the control files. Advantageously, the control file contains only 80000 single-digit numbers and is therefore less than 100 kb in size. In contrast, a uncompressed text file containing one million individual eight-character passwords would exceed 9 Mb in size.

Furthermore, since the password panel 50 acts as a full text editor, a substantially unlimited number of password combinations can be set and recalled. Furthermore, significant editing events, such as sequence repetition, character reversal or case change, can be achieved by actuating only single buttons 60, 54, 56. The final password can be copied and pasted as desired using the standard clipboard functions available on current computer systems and devices.

In addition, the arrays of control files may be unique to each unit. Thus, for a given sequence of images and editing steps, no two modules produce the same password. This means that even if the sequence of images and editing steps becomes known to a third party, the third party will be unable to replicate the password unless the specific unit by which the password was created is used. This provides additional security.

Further security may be provided by including several different control files within a single unit. The control file may be selected within the unit by the user. This may help to prevent an attacker from reverse-engineering the password by hacking into the unit coding since it will be unclear as to which control files have been used to set up the password.

It is to be noted, however, that the use of a control file is not essential—in one embodiment of the invention the six-digit number generated from the selection of the three images is itself used to determine the number of steps rotated by each rotor, thereby to define the basic password. In this case, it may be necessary to decrease the number of rotors to six, to correspond to a respective one of the digits in the six-digit number, or to increase the number of images required to be selected to four, so that the selection of images results in an eight-digit number corresponding to the number of rotors.

It is also advantageous that the invention is portable, in that the unit can be installed and operated as a standalone application on substantially any electronic device which has a display and a means for selecting the images and operating the buttons of the user interface. Thus, the unit can be installed on a mobile telephone or PDA, allowing the password to be readily recalled and read out when required.

The invention advantageously does not rely on a "shared secret" such as a pattern or key. On the contrary, the unit itself does not interact with any external software applications and therefore requires no modification or adjustment to externally hosted software applications.

The invention finds application in any industries and technical fields in which passwords for identity verification are required. By enabling much longer and more complex passwords to be created and recalled simply and easily, significant improvements in electronic security can be obtained.

For example, the invention may find use in personal identification applications, login interfaces (such as the standard Windows® login), online services, master passwords for password management applications and when accessing electronic files and documents.

Devices on which the invention may be installed and used include desktop PCs, laptops, hard disk drives, SSD drives, video players, video cameras, networked PCs, PDAs, USB flash drives, mobile phones, music players, or televisions.

The unit can also be used as a public/private key combination with the unit being the public key and the picture password forming the private key. By way of example, the invention could be incorporated into the websites of online companies as a means not simply for remembering passwords but for entering them into the requesting text field.

Because the data size of the unit is relatively small, it can be transported with documents and files electronically or may be embedded within the files themselves.

In addition, modules could be incorporated in ATM cash dispensers, POS terminals or mobile telephone payment systems.

The invention can also be used to improve security replacing locks for homes, offices and hotels, vehicle access, alarms and safes and key-less entry systems.

The above described embodiments are provided by way of example only and are not intended to limit the invention in any way. In particular, none of the various features or functions described above, including the aggregator toggle, the character reverse function, the case change function etc. are considered to be essential to the operation of the invention but are advantageous. Furthermore, each of these functions or features may be employed singly or in combination as desired, as they are not necessarily mutually dependent.

Indeed, in one basic form the invention provides a plurality of images which, when selected either individually or in a sequence, returns a pseudo-random, multi-character password which is editable and can be copied and pasted into other software applications.

The number of images, the number of digits in the pointer number, the size of the control file matrix, the number of rotors and the number of characters in each rotor may all be selected as desired. Increasing these numbers may increase the number and/or length of the basic passwords generated by the password generator, thereby further increasing security, but may disadvantageously increase file size and increase operational complexity.

On the other hand, reducing these parameters may reduce file size and simplify user operation. Furthermore, due to the flexibility and versatility of the aggregator (editing) function, reducing these parameters does not necessarily reduce security since the user is still able to edit the basic passwords generated by the password generator in a substantially unlimited manner.

It is not essential that the unit be coded using Adobe® Flash® and any desired programming language can be used. The user interface can be styled as desired.

Nevertheless, various additional features, modifications or improvements may be made to the invention without departing from the scope thereof.

For example, the unit may additionally feature an auto copy/paste function wherein the content of the password panel is copied and pasted into the relevant text readout box on the web page requesting identity verification by actuating a single button.

Although the above description concerning the operation of the rotor sequence describes the rotors moving relative to the window, it will be appreciated that the same effect may be achieved by moving each window relative to the rotor.

Help or information buttons 66, 68 may also be provided to provide assistance or guidance to the user, or to display product, service or sponsor information to the user or to select options.

This application claims priority from UK patent application no. GB1106943.2 filed on 27 Apr. 2011, the entire contents of which are expressly incorporated by reference herein.

The invention claimed is:

1. A method for generating and/or recalling a password comprising:
   generating a multi-digit number in dependence on the selection by a user of one or more images, wherein the generating step comprises:
      generating a first multi-digit number associated with the one or more selected images; and
      determining a second multi-digit number using the first multi-digit number;
   stepping through each of a plurality of sequences of alphanumeric characters by an amount corresponding to a respective one of the numbers in the second multi-digit number thereby to identify a respective character; and
   displaying to said user the respective alphanumeric character from each of the sequences thereby to form said password;
   wherein the above steps are implemented by an electronic computing device having a processor and memory storing computer code that, when executed by the processor, carries out the above steps on the device.

2. A method as claimed in claim 1, comprising displaying a plurality of unique images for selection by the user and associating each image with a number.

3. A method as claimed in claim 2 wherein generating the multi-digit number comprises applying an operator to the respective number associated with each image selected by the user thereby so as to form said first multi-digit number.

4. A method as claimed in claim 2, comprising concatenating the numbers associated with each of a plurality of selected images thereby to define said first multi-digit number.

5. A method as claimed in claim 2, wherein generating the multi-digit number comprises permitting said user to select two or more images from said plurality of images, associating a respective two-digit number with each of the selected images, and concatenating the at least two two-digit numbers to define said first multi-digit number.

6. A method as claimed in claim 1, comprising providing a plurality of image sets, each image in a common set being associated with a respective two-digit number.

7. A method as claimed in claim 6, comprising three sets of images, each set being displayable to a user in the form of a plurality of pages each page comprising a plurality of images.

8. A method as claimed in claim 7, comprising generating three two-digit numbers, each two-digit number corresponding to a selected image from a respective one of the sets, concatenating the three two-digit numbers to form a six-digit number, said six-digit number defining the first multi-digit number.

9. A method as claimed in claim 1, wherein the step of determining a second multi-digit number further comprises determining the second multi-digit number from a matrix of numbers in dependence on the first multi-digit number.

10. A method as claimed in claim 9, wherein determining the second multi-digit number comprises:
identifying in the matrix of numbers a start number corresponding to the first multi-digit number; and
determining a sequence of numbers from the matrix having a predetermined relationship to the start number, said sequence defining the second multi-digit number.

11. A method as claimed in claim 1, wherein each of the plurality of sequences of alphanumeric characters comprises a rotor having a default alphanumeric character and which is rotatable through a number of steps corresponding to a numerical value of a respective digit in the first or second multi-digit number.

12. A method as claimed in claim 1, further comprising generating a respective basic password on selection by the user of each of a plurality of images and automatically copying each of the respective basic passwords into an editing panel, thereby to combine or concatenate same as they are generated thereby to form said password.

13. A method as claimed in claim 1, further comprising editing the password using one or more of the following functions:
resetting the password to a default password;
reversing the sequence of characters in the password;
changing the case of the sequence of characters in the password;
adding or appending multiples of the password, for example 1×, 2×, 4×, 8× and 16× multiples;
adding, changing or deleting characters in the password.

14. A device, comprising:
a processor and memory having code stored thereon in a non-transitory manner wherein, upon execution of the code by the processor, the device operates to:
permit a user to select two or more images from a plurality of sets of images;
associate each selected image from each set of images with a respective number;
generate a first multi-digit number by concatenating the respective numbers;
identify in a matrix of numbers a start number corresponding to the first multi-digit number;
determine a sequence of numbers from the matrix having a predetermined relationship to the start number, said sequence defining a second multi-digit number;
step through each of a plurality of alphanumeric character sequences from a default character by an amount corresponding to the numerical value of a respective digit of the second multi-digit number to thereby identify a respective character; and
display the resulting character from each of the sequences to form a basic password.

15. A device, comprising:
a processor and memory;
an image selection module for permitting a user to select one or more images from a plurality of images;
a generating module for generating a first multi-digit number based on the one or more selected images;
a control module for determining a second multi-digit number using the first multi-digit number;
a password generator module for generating a basic password by stepping through each of a plurality of sequences of alphanumeric characters by an amount corresponding to a respective one of the numbers in the second multi-digit number to thereby identify a respective character, and to form the basic password from the respective alphanumeric character from each of the sequences; and
a display for displaying the basic password;
wherein the modules are provided by computer-executable code stored on the memory in a non-transitory manner.

16. A device as claimed in claim 15 wherein:
the image selection module is configured to present a plurality of unique images for selection by a user, the images being displayed in the form of sequentially accessible grids or matrices of images that together constitute an image set or stack, each of the images in the set or stack having associated with it a respective identification number; and
wherein on selection of images from each of the plurality of image sets or stacks the image selection module is configured to concatenate the respective identification numbers to form the first multi-digit number that defines a reference pointer to a corresponding number within a matrix or sequence of numbers in the control module.

17. A device as claimed in claim 16, wherein the control module comprises one or more sets of randomly generated numbers and is configured to select a sequence of numbers therefrom in dependence on the reference pointer defined by the first multi-digit number, so as to generate the second multi-digit number.

18. A device as claimed in claim 17, wherein the control module is arranged to generate the second multi-digit number having a number of digits corresponding to a number of ASCII or alphanumeric character sequences within the password generator module.

19. A device as claimed in claim 18, wherein the password generator module comprises a plurality of rotors, rows or columns, each representing a respective one of said ASCII or alphanumeric character sequences, one of said characters in each sequence defining a respective default character for that sequence, wherein the password generator module is configured to step through each of the sequences, starting from the respective default character, by a number of steps corresponding to the numerical value of a respective one of the digits in the second multi-digit number and to output the resulting ASCII or alphanumeric character from each sequence thereby to form the or each basic password therefrom.

* * * * *